(12) United States Patent
Pafumi et al.

(10) Patent No.: US 8,495,412 B2
(45) Date of Patent: Jul. 23, 2013

(54) AUTONOMOUS PROPAGATION OF VIRTUAL INPUT/OUTPUT (VIO) OPERATION(S) TO SECOND VIO SERVER (VIOS) DUE TO A DETECTED ERROR CONDITION AT A FIRST VIOS

(75) Inventors: James A. Pafumi, Leander, TX (US); Jacob J. Rosales, Austin, TX (US); Morgan J. Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 12/879,978

(22) Filed: Sep. 10, 2010

(65) Prior Publication Data
US 2012/0066543 A1    Mar. 15, 2012

(51) Int. Cl.
*G06F 11/00*    (2006.01)
(52) U.S. Cl.
USPC ............................ 714/4.1; 714/4.11
(58) Field of Classification Search
USPC .............................................. 714/4
See application file for complete search history.

(56) References Cited

U.S. PATENT DOCUMENTS

| | | | |
|---|---|---|---|
| 7,143,250 B1 * | 11/2006 | Riedl | 711/162 |
| 7,437,448 B1 * | 10/2008 | Kohler et al. | 709/224 |
| 7,568,052 B1 * | 7/2009 | Cwiakala et al. | 710/8 |
| 7,577,865 B2 | 8/2009 | Nguyen | |
| 7,631,066 B1 | 12/2009 | Schatz | |
| 7,844,757 B2 * | 11/2010 | Mani et al. | 710/38 |
| 7,886,186 B2 * | 2/2011 | Kumagai | 714/6.3 |
| 8,019,966 B2 * | 9/2011 | Nevarez et al. | 711/203 |
| 8,028,147 B2 * | 9/2011 | Nevarez et al. | 711/203 |
| 8,041,877 B2 * | 10/2011 | Nevarez et al. | 711/6 |
| 8,099,522 B2 * | 1/2012 | Anderson et al. | 710/5 |
| 8,145,871 B2 * | 3/2012 | Pafumi et al. | 711/170 |
| 2004/0003141 A1 * | 1/2004 | Matters et al. | 710/1 |
| 2004/0204148 A1 | 10/2004 | Sudo | |
| 2008/0244306 A1 * | 10/2008 | Kumagai | 714/3 |
| 2009/0150534 A1 * | 6/2009 | Miller et al. | 709/223 |
| 2009/0307460 A1 * | 12/2009 | Nevarez et al. | 711/203 |
| 2009/0313401 A1 * | 12/2009 | Mani et al. | 710/38 |
| 2010/0122111 A1 * | 5/2010 | Allen et al. | 714/3 |

\* cited by examiner

*Primary Examiner* — Kamini Patel
(74) *Attorney, Agent, or Firm* — Yudell Isidore Ng Russell PLLC

(57) ABSTRACT

A method provides input/output (I/O) redundancy within a data processing system having (a) a client logical partition (LPAR) that generates and consumes I/O requests, (b) a plurality of virtual input/output servers (VIOS) that are communicatively inter-connected with each other to form a VIOS cluster and which include virtual I/O adapters for connecting to a fabric that provides access to a block storage. In one embodiment, a first VIOS receives an I/O request from the client LPAR. The first VIOS detects that a problem exists with a fabric connection to the block storage, and the first VIOS responds to the detected connection problem by autonomously propagating the I/O request to a second VIOS to which the first VIOS is connected. Forwarding of the I/O request to the block storage is subsequently completed by the second VIOS.

21 Claims, 9 Drawing Sheets

AUTONOMOUS PROPAGATION OF VIRTUAL INPUT/OUTPUT (VIO) OPERATION(S) TO SECOND VIO SERVER (VIOS) DUE TO A DETECTED ERROR CONDITION AT A FIRST VIOS

CROSS REFERENCED APPLICATIONS

The present application is related to the subject matter of the following commonly-assigned, co-pending patent applications, filed on even date herewith: U.S. Ser. No. 12/880,044, titled "Cluster Aware Virtual Input/Output Server." The entire content of the related application is incorporated herein by reference.

BACKGROUND

1. Technical Field

The present invention relates in general to clustered data processing systems and in particular to clustered data processing systems with cluster-aware virtual input/output servers (VIOSes). Still more particularly, the present invention relates to propagation of virtual I/O functionality within a clustered data processing system.

2. Description of the Related Art

Virtualized data processing system configuration, which provides the virtualization of processor, memory and Operating System (OS) resources are becoming more and more common in the computer (and particularly the computer server) industry. To a lesser extent, storage virtualization is also known and provided in limited environments. However, within the virtualization computing environment, storage virtualization and management is implemented as a separate virtualization model from server virtualization and management. Thus, different client logical partitions (LPARs) associated with different virtualized server systems may access the same storage access network (SAN) storage. However, the client LPARs on one server do not have any "knowledge" of whether the SAN disk that the client LPAR is trying to access is being used by some other client LPAR belonging to the same server or another server. The conventional implementation of distributed server systems providing storage virtualization within shared SAN storage can cause data integrity issues and may potentially cause data corruption and client partition crashes.

Additionally, for systems that employ virtual input/output (I/O), or VIO, by which one or more virtual client partitions utilizes I/O resources of a VIO server (VIOS) on the virtualized server, execution of such VIO operations requires the assigned VIOS to be functional. However, a VIOS may occasionally fail or loose access to the physical fabric. The client partition thus looses its I/O connectivity to the storage resource (e.g., SAN), and all virtual resources exported to or from the virtual client partition will result in I/O failures or operating system crashes.

BRIEF SUMMARY

Disclosed are a method, system, and a computer program product that provide redundancy with virtual input/output (VIO) resources of a client logical partition to prevent input/output (I/O) errors and system crashes due to a communication fault, such as a fabric loss condition of a VIO server (VIOS) within a data processing system (DPS) having a plurality of cluster-aware VIOSes. The method provides VIO redundancy by allowing I/O requests to be autonomously propagated to other VIOSes in the cluster when certain pre-defined conditions exist or are encountered/detected. The pre-defined conditions include conditions, such as a fabric loss, which negatively affects the ability of an assigned VIOS to provide VIO services for the client LPAR.

In one embodiment, the method comprises: a first VIOS receiving an I/O request from the client LPAR; detecting that a problem exists with a fabric connection to the shared repository; and autonomously propagating the I/O request to a second VIOS to which the first VIOS is connected for completion of the I/O request at the second VIOS. The method further comprises: receiving an I/O response from the second VIOS; identifying that the I/O response is associated with the I/O request that was propagated to the second VIOS; and in response to the I/O response being associated with the I/O request, forwarding the I/O response to the client LPAR.

In one embodiment, the propagating of the I/O request to the second VIOS further comprises: forwarding a first cluster-level request message to the second VIOS requesting the second VIOS take over handling of the I/O request; receiving a first cluster-level response message indicating that the second VIOS can handle the I/O request; and propagating the I/O request responsive to receiving the first cluster-level response message. Additionally, in a related embodiment, the method further comprises receiving a second cluster-level response message indicating that the second VIOS cannot take over handling of the I/O request; and identifying a third VIOS within the VIOS cluster; forwarding a second cluster-level request message to the third VIOS; and autonomously propagating the I/O request to the third VIOS in response to receiving confirmation from the third VIOS that the third VIOS can handle the I/O request.

The propagating of the I/O request to the second VIOS comprises selecting the second VIOS from one or more VIOSes within the cluster that are pre-assigned as a backup VIOS for redundant I/O processing of I/O requests of the first VIOS. According to one or more implementation, said selecting the second VIOS includes selecting a closest path VIOS as the second VIOS, wherein the closest path VIOS is one or more of: a VIOS which takes a least amount of propagation time for transfer of the I/O request from the first VIOS; a VIOS which takes a least amount of propagation time for completing an I/O request at the distributed shared repository; and a VIOS among the VIOS cluster that is physically located on a same computing electronic complex (CEC).

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The described embodiments are to be read in conjunction with the accompanying drawings, wherein.

DETAILED DESCRIPTION

Figure 1A:
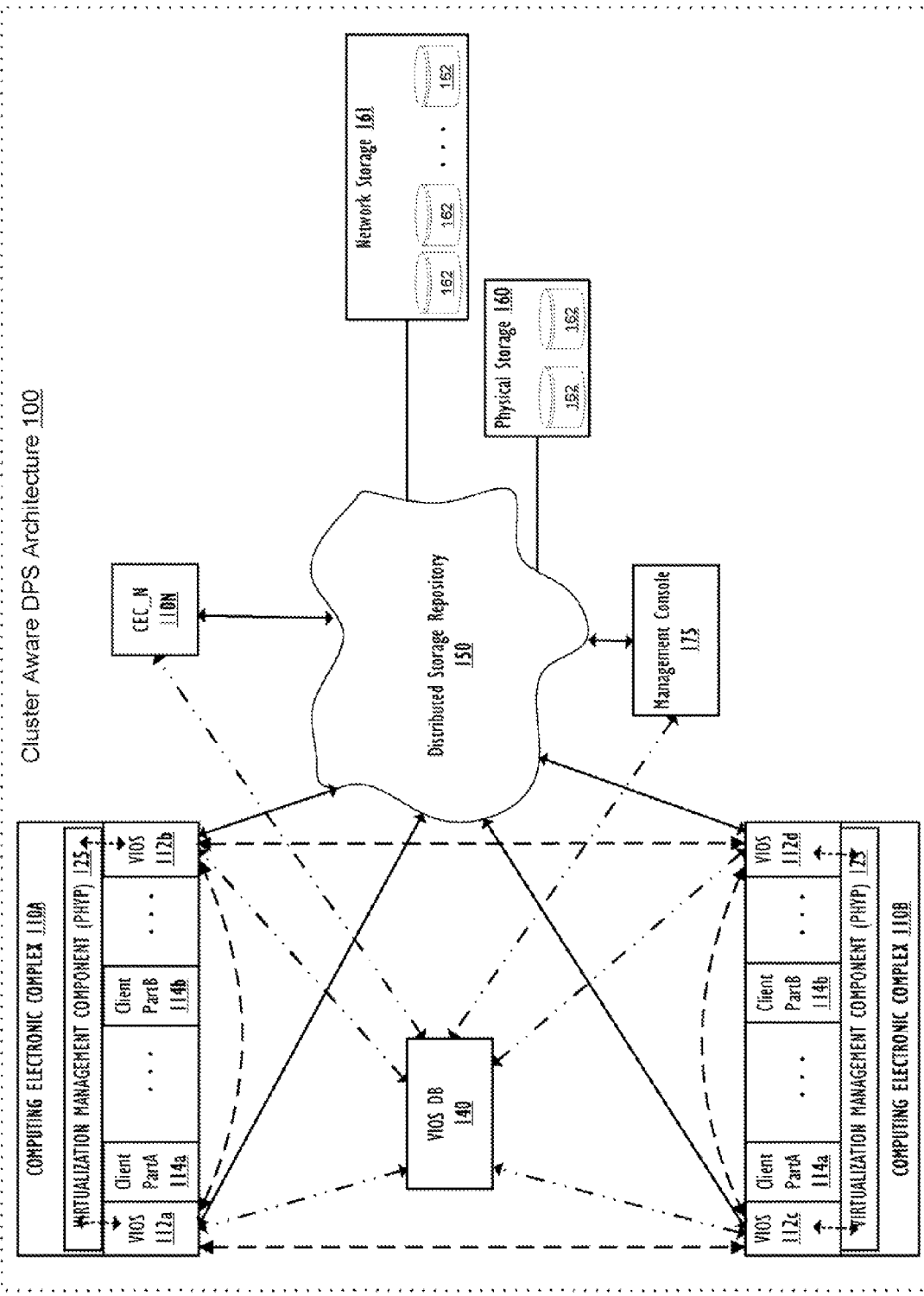
FIG. 1A illustrates a first view of a cluster (aware) data processing system within which various of the functional features of the described embodiments are implemented, according to one embodiment.

The illustrative embodiments provide a method, data processing system, and computer program product that enables a Virtual Input/Output (I/O) Server (VIOS) to provide redundancy for virtual input/output (VIO) resources of a client logical partition to prevent input/output (I/O) errors and system crashes due to a fabric loss condition of the VIOS. The method is performed within a VIOS cluster of a data processing system (DPS) environment/architecture in which one or more cluster-aware VIOSes enable efficient, secure access for a client logical partition (LPAR) to a single shared, distributed storage repository/resource of the DPS. One or more client LPARs and one or more VIOSes are located on a computing electronic complex (CEC), which is a computing node within the DPS environment. The method provides VIO redundancy by allowing I/O requests to be autonomously propagated to other VIOSes in the cluster when certain pre-defined conditions exist or are encountered or detected. The pre-defined conditions include conditions, such as a fabric loss, which negatively affects the ability of an assigned VIOS to provide VIO services for the client LPAR.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized. For example, as utilized herein, the term cluster-aware refers to the operational state of each VIOS within the cluster where the VIOSes contain information about which other VIOSes are connected within the cluster, the configuration of the different CECs within the DPS supported by the cluster, information about which client LPARs are supported by each VIOS, and other state and operating information and data related to performing VIO operations using the physical I/O devices of the DPS and those of the distributed storage repository (storage repository). Cluster awareness is supported by both a shared, networked VIOS database and locally maintained copies of VIOS cluster data within each VIOS.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture having a specific number of processing nodes (e.g., computing electronic complexes). The illustrative and described embodiments assume that the system architecture may be scaled to a much larger number of processing nodes.

In the following descriptions, headings or section labels are provided to separate functional descriptions of portions of the invention provided in specific sections. These headings are provided to enable better flow in the presentation of the illustrative embodiments, and are not meant to imply any limitation on the invention or with respect to any of the general functions described within a particular section. Material presented in any one section may be applicable to a next section and vice versa. The following sequence of headings and subheadings are presented within the specification:

A. General Architecture
B. Cluster-Aware VIOS
C. Autonomous Propagation of Virtual IO to Second VIOS Due to Fabric Loss A. General Architecture With specific reference now to FIG. 1A, there is depicted a block diagram of an example cluster-aware (CA), distributed data processing system (DPS) architecture 100, within which the functional aspects of the described embodiments may advantageously be implemented. For simplicity, cluster-aware, distributed DPS architecture 100 shall be referred to herein simply as DPS 100. DPS 100 comprises a plurality of computing nodes, each referred to herein as a computing electronic complex (CEC), of which CECs 110A and 110B are illustrated. The number of CECs within DPS 100 may vary, ranging from a single CEC in a smaller system extending up to hundreds or thousands of CECs, in larger scaled systems. For simplicity, the embodiments shall be described from the perspective of a single CEC (CEC 110A) or two CECs (CECs 110A, 110B). Each CEC 110A-110B comprises at least one (and in most instances a plurality of) Virtual Input/Output Server 112 (also referred to herein as a VIO Server or VIOS), with functionality as described below. The actual number of VIOSes 112 within each CEC 110 of DPS 100 is a design feature and may vary. Also supported within each CEC 110A-110B are client logical partitions (interchangeably referred to as client LPARs or "clients"), of which a first two clients, clientA 114a and clientB 114b, are illustrated. As described below, with reference to FIG. 2, client LPARs 114 are logical partitions of a virtualized (or operating system partitioned) computing system. The actual number of clients within each CEC 110 may vary and could range from a single client to hundreds or thousands of clients, without limitation. For efficiency in presenting the inventive concepts herein, only two clients are presented within each CEC 110 of the various illustrative and described embodiments.

DPS 100 also comprises a distributed storage facility, accessible to each of the CECs 110 and the components within the CECs 110. Within the described embodiments, the distributed storage facility will be referred to as distributed storage repository 150, and the distributed storage repository 150 enables several of the client level functional features provided by the embodiments described herein. Distributed storage repository 150 provides a single view of storage that is utilized by each CEC 110 and for each client 114 of each CEC 110 within a cluster-aware, distributed system. Distributed storage repository 150 comprises local physical storage 160 and network storage 161, both of which comprise multiple physical storage units 162 (e.g., disks. solid state drives, etc.). The physical disks making up distributed storage repository 150 may be distributed across a storage network (e.g., a SAN). Additionally, distributed storage repository 150 provides a depository within which is stored and maintained the software utility, instruction code, OS images, client images, data (system, node, and client level), and/or other functional information utilized in maintaining the client-level, system management, and storage-level operations/features of DPS 100. In addition to distributed storage repository 150, DPS 100 also comprises a VIOS database (DB) 140, which may also be a distributed storage facility comprising physical disks across a storage network. VIOS DB (or DB) 140 is a repository that stores and provides access to various cluster configuration data and other functional components/modules and data structures that enable the various cluster-aware functionality described herein. In one embodiment, portions of distributed storage repository 150 may be allocated to provide storage pools for a cluster. Each VIOS 112 of the cluster maintains a local view of the DB 140 and updates the cluster level information/data/data structures within DB 140 as such information/data is created or updated.

Communication between each VIOS 112 of each CEC 110 as well as with the VIOSes of at least one other CEC 110 is generally supported via a plurality of inter-CEC interconnects, illustrated as bi-directional, dashed lines connecting pairs of VIOSes 112. The arrows indicated two way data exchange or communication between components. In addition to the inter-CEC interconnects, each VIOS 112 is also connected to distributed storage repository 150 via VIOS-to-Store or CEC-to-Store interconnects, which are also illustrated as full lined bi-directional arrows. Also, each VIOS 112 is connected to DB 140 via VIOS-to-DB interconnects, presented as dashed and dotted lines. With the exception of the inter-CEC connectors running from a first VIOS (e.g., VIOS 112a) of a first CEC to a second VIOS (e.g., VIOS 112b) on the same CEC, the various interconnects represent a network level connectivity between the VIOS nodes of the cluster and the DB 140 and the distributed storage repository 150. As utilized herein, references to one or more "nodes", are assumed to refer specifically to a VIOS within the cluster. DPS 100 also comprises a management console 175 on which a management tool (not shown) executes.

Figure 1B:
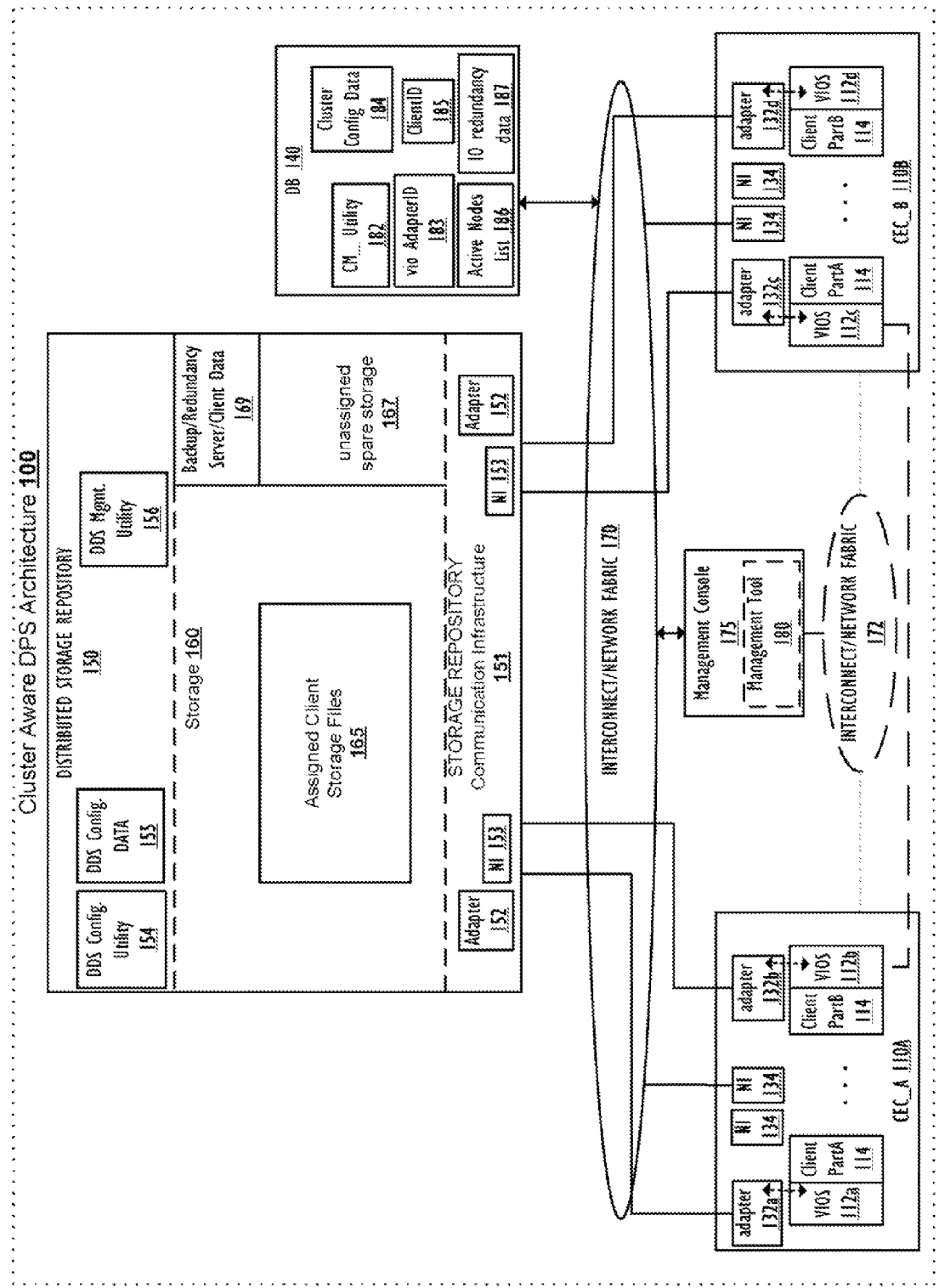
FIG. 1B illustrates a second view of the cluster data processing system (DPS) of FIG. 1A depicting additional functional components within the computing complexes and shared storage, according to one embodiment.

Turning now to FIG. 1B, there is illustrated another view of DPS 100 illustrating the network-based connection of the CECs 110 to the distributed storage repository 150 and DB 140. FIG. 1B illustrates in greater detail the network connectivity of VIOSes and CECs to each other and to Distributed storage repository 150. With this view, CEC_A (Node A) 110A and CEC_B (Node_B) 110B comprise similar constructs as presented in FIG. 1A. Each CEC 110 within DPS 100 connects to distributed storage repository 150 via one or more networks and/or I/O interconnect/switch fabric (generally illustrated as interconnect/network fabric 170). The descriptions and illustrations assume that at least some of the CECs 110 of DPS 100 and distributed storage repository 150 are located remotely from each other, including being located in different countries, for example, such that no direct physical connectivity exists between the respective devices. For simplicity, the embodiments are described as having primary interconnect/network 170 comprising a private wide area network (WAN) or a public WAN (such as the Internet), although other network types (e.g., a local area network) are possible and supported.

As depicted, in one or more embodiments, each CEC 110 is also connected to one or more neighbor CECs 110, in order to provide efficient fail-over and/or mobility support and other functions, as described hereinafter. As utilized herein, the term neighbor refers to a connected second CEC with which a first CEC is able to communicate, and references to a neighbor CEC is not limited to a second CEC in geographic proximity to the first CEC. CEC_A 110A and CEC_B 110B are illustrated connected to each other via some connecting medium, which may include a different network (such as a local area network) 172 or some type of direct interconnect (e.g., a fiber channel connection) when physically close to each other. The connection between neighbor CECs 110A and 110B is illustrated as a direct line connection or a secondary network connection (172) between CECs 110A and 110B. However, it is appreciated that the connections are not necessarily direct, and may actually be routed through the same general interconnect/network 170 as with the other CEC connections to distributed storage repository 150. In one or more alternate embodiments, the connections between CECs may be via a different network (e.g., network 172, FIG. 1B), such as a local area network (LAN).

Also illustrated by FIG. 1B is an initial view of the component make-up of an example distributed storage repository 150 and an initial listing of some components of DB 140. As depicted, each CEC 110 comprises one or more network interfaces 134 and one or more I/O adapters 132 to enable the CEC 110 and thus the other components (i.e., client partitions) of the CEC 110 to engage in network level communication, as described below. Specifically, each VIOS 112 emulates virtual client I/O adapters to enable communication by the client LPARs 114 with distributed storage repository 150 and/or other clients, within the same CEC or on a different CEC. The VIOSes 112 emulate virtual I/O adapters and communicates with distributed storage repository 150 by connecting with corresponding virtual sever I/O adapters at distributed storage repository 150. The VIOSes 112 within each CEC 110 are thus able to support client level access to distributed storage 150 and enable the exchange of system level and client level information with distributed storage repository 150.

In addition, each VIOS 112 also comprises the functional components/modules and data to enable the VIOSes 112 within DPS 100 to be aware of the other VIOSes anywhere within the cluster (DPS 100). From this perspective, the VIOSes 112 are referred to herein as cluster-aware, and their interconnected structure within DPS 100 thus enables DPS 100 to also be interchangeably referred to as cluster-aware DPS 100. As a part of being cluster-aware, each VIOS 112 also connects to DB 140 via network 170 and communicates cluster-level data with DB 140 to support the cluster management functions described herein.

To support the virtual I/O operations with the VIOSes 112 and the associated virtual client I/O adapters, distributed storage repository 150 comprises communication infrastructure 151. Communication infrastructure 151 comprises network interface(s) 153 and a plurality of server I/O adapters 152 utilized for cluster-level communication and enabling access to data/code/software utility stored on distributed storage repository 150 to complete I/O operations thereto. Specifically, these server I/O adapters are also presented as virtual sever I/O adapters, which are paired with virtual I/O adapters (132) that are assigned to clients 114 of CECs 110.

As shown with FIG. 1B, distributed storage repository (DSR) 150 also comprises a plurality of software, firmware and/or software utility components, including DSR configuration utility 154, DSR configuration data 155 (e.g., inodes for basic file system access, metadata, authentication and other processes), and DSR management utility 156.

To support the cluster awareness features of the DPS 100, and in accordance with the illustrative embodiment, distributed storage repository 150 also comprises VIOS database (DB) 140, in which is stored various data structures generated during set up and/or subsequent processing of the VIOS cluster-connected processing components (e.g., VIOSes and management tool). DB 140 comprises a plurality of software or firmware components and/or and data, data modules or data structures, several of which are presented in FIG. 1B, for illustration. Among these components are cluster management (CM) utility 182, VIO AdapterID data structure 183, cluster configuration data 184, Client identifying (ID) data 185, active nodes list 186, and I/O redundancy data 187, among others. These various components support the various clustering functionality and cluster-aware I/O operations of the one or more VIOSes 112, as described herein. Additional features of DB 140 and distributed storage repository 150 as well as the specific components or sub-components that enable the various clustering functionality are presented within the description of the remaining figures and throughout the description of the various embodiments.

These various data structures are created, maintained and/or updated, and/or deleted by the various operations of one or more of the processing components. In one embodiment, the initial set up of the storage pools, VIOS DB 240 and corresponding data structures is activated by execution of a cluster aware operating system by management tool 180. Once the infrastructure has been established, however, maintenance of the infrastructure, including expanding the number of nodes, where required, is performed by the VIOSes in communication with DB 140 and the management tool 180.

Also associated with DPS 100 and communicatively coupled to distributed storage repository 150 and DB 140 and VIOSes 112 is management console 175, which may be utilized by an administrator of DPS 100 (or of distributed storage repository 150 or DB 140) to access DB 140 or distributed storage repository 150 and configure resources and functionality of DB 140 and of distributed storage repository 150 for access/usage by the VIOSes 112 and clients 114 of the connected CECs 110 within the cluster. As shown in FIG. 1B and described throughout the specification, management tool 180 is implemented within management console 175. However, it is appreciated that (resources of) any node within DPS 100 may be selected/elected to perform the functions of management tool 180, and the selected node would then perform one or more of the below described cluster creation and the other cluster monitoring and management functions, utilizing the availability of the resources provided by DB 140 and distributed storage repository 150.

In an alternate embodiment, management tool 180 is an executable module that is executed within a client partition at one of the CECs within DPS 100. In one embodiment, the management tool 180 controls the operations of the cluster and enables each node within the cluster to maintain current/updated information regarding the cluster, including providing notification of any changes made to one or more of the nodes within the cluster.

Figure 2:
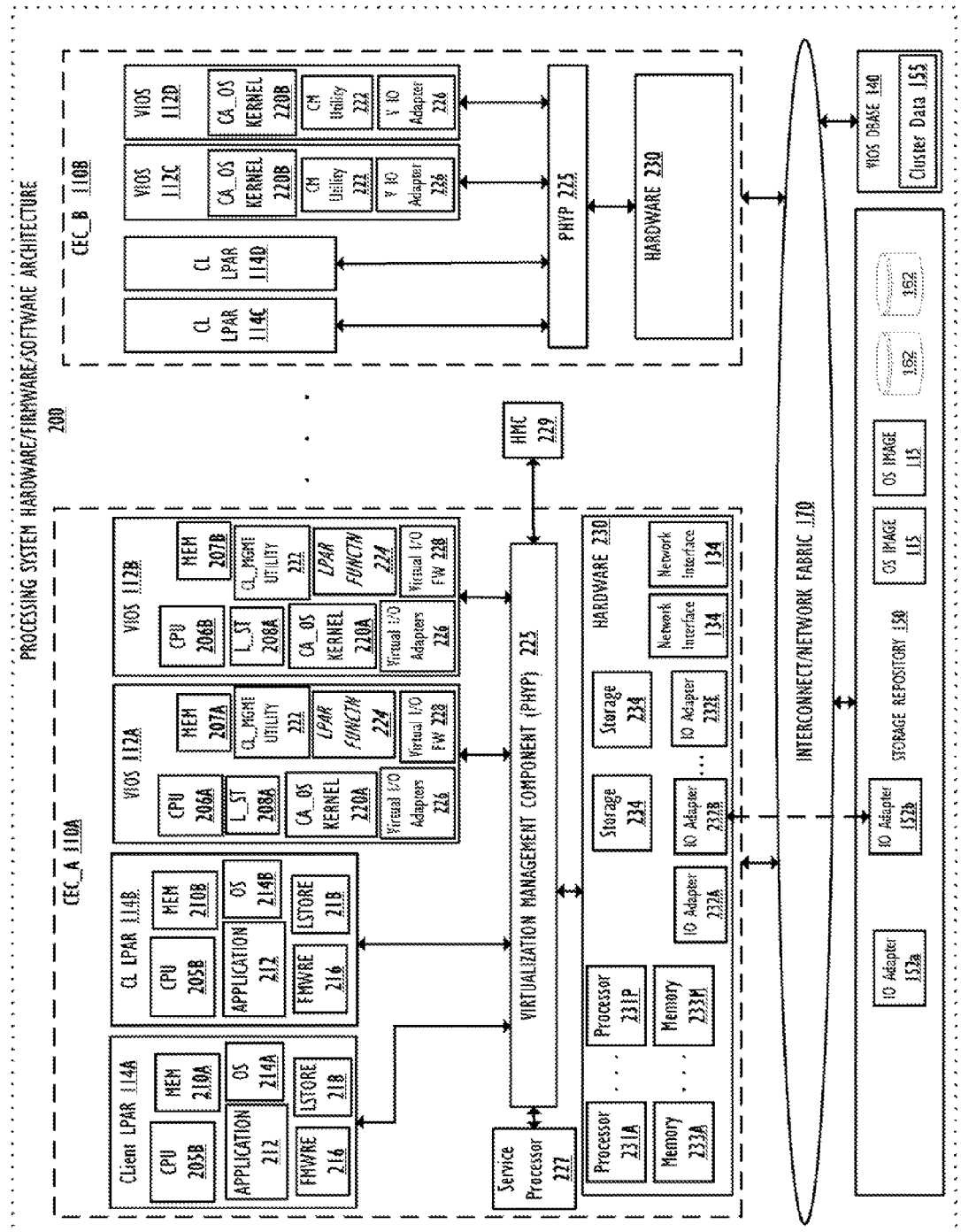
FIG. 2 illustrates an internal configuration of a computing electronic complex (CEC) within the cluster DPS having virtualized OS partitions, including virtual I/O server (VIOS) partitions, according to one embodiment.

With reference now to FIG. 2, there is presented a third view of an example DPS 100, emphasizing a processing system architecture 200 (i.e., architecture of the individual CECs, and specifically CEC_A 110A). CEC_A 110A (CEC 110A) serves as the example CEC that is described in greater detail in FIG. 2 and throughout the specification. CEC 110A is presented as a server that comprises hardware components and software/firmware/OS components that are logically partition to create a plurality of virtualized machine partitions, which are assigned as client logical partitions (LPARs) and virtual I/O servers (VIOSes). Hardware components 230 of example CEC 110A comprises one or more processors 231A-231P, one or more memories 233A-233M, and local storage 234. The processors 230A-230P are interconnected with one or a plurality of memories 233A-233M and with local storage 234 via a bus, interconnect/switch or an interconnect fabric (not specifically shown). The specific internal connectivity of components, which may be distributed across a large scale interconnect fabric, is not germane to the described embodiments, and no further detail is presented regarding the particular type of interconnectivity between the system hardware components.

Also included within hardware components 230 are one or more physical network interfaces 134 by which CEC_A 110A connects to an external network, such as network 170, among others. Additionally, hardware components 230 comprise a plurality of I/O adapters 232A-232E, which provides the I/O interface for CEC_A 110A. I/O adapters 232A-232E are physical adapters that enable CEC_A 110 to support I/O operations via an I/O interface with both locally connected and remotely (networked) connected I/O devices, including SF storage 150. Examples of I/O adapters include Peripheral Component Interface (PCI), PCI-X, or PCI Express Adapter, and Small Computer System Interconnect (SCSI) adapters, among others. CEC 110 is logically partitioned such that different I/O adapters 232 are virtualized and the virtual I/O adapters may then be uniquely assigned to different logical partitions.

Logically located above the hardware level (230) is a virtualization management component, provided as a Power Hypervisor (PHYP) 225 (trademark of IBM Corporation), as one embodiment. While illustrated and described throughout the various embodiments as PHYP 225, it is fully appreciated that other types of virtualization management components may be utilized and are equally applicable to the implementation of the various embodiments. PHYP 225 has an associated service processor 227 coupled thereto within CEC 110. Service processor 227 may be used to provide various services for one or more logical partitions. PHYP 225 is also coupled to hardware management controller (HMC) 229, which exists outside of the physical CEC 110. Operations of the different logical partitions may be controlled through HMC 229, which is a separate data processing system from which a system administrator may perform various functions, such as reallocation of resources to different logical partitions.

CEC_A 110A further comprises a plurality of user-level logical partitions (LPARs), of which a first two are shown, represented as individual client LPARs 114A-114B within CEC 110A. According to the various illustrative embodiments, CEC 110A supports multiple clients and other functional operating OS partitions that are "created" within a virtualized environment. Each LPAR, e.g., client LPAR 114A, receives an allocation of specific virtualized hardware and OS resources, including virtualized CPU 205A, Memory 210A, OS 214A, local firmware 216 and local storage (LStore) 218. Each client LPAR 114 includes a respective host operating system 214 that controls low-level access to hardware layer (230) of CEC 110A and/or to virtualized I/O functions and/or services provided through VIOSes 112. In one embodiment, the operating system(s) may be implemented using OS/400, which is designed to interface with a partition management firmware, such as PHYP 225, and is available from International Business Machines Corporation. It is appreciated that other types of operating systems (such as Advanced Interactive Executive (AIX) operating system, a trademark of IBM Corporation, Microsoft Windows®, a trademark of Microsoft Corp, or GNU®/Linux®, registered trademarks of the Free Software Foundation and The Linux Mark Institute) for example, may be utilized, depending on a particular implementation, and OS/400 is used only as an example.

Additionally, according to the illustrative embodiment, CEC 110A also comprises one or more VIOSes, of which two, VIOS 112A and 112B, are illustrated. In one embodiment, each VIOS 112 is configured within one of the memories 233A-233M and comprises virtualized versions of hardware components, including CPU 206, memory 207, local storage 208 and I/O adapters 226, among others. According to one embodiment, each VIOS 112 is implemented as a logical partition (LPAR) that owns specific network and disk (I/O) adapters. Each VIOS 112 also represents a single purpose, dedicated LPAR. The VIOS 112 facilitates the sharing of physical I/O resources between client logical partitions. Each VIOS 112 allows other OS LPARs (which may be referred to as VIO Clients, or as Clients 114) to utilize the physical resources of the VIOS 112 via a pair of virtual adapters. Thus, VIOS 112 provides virtual small computer system interface (SCSI) target and shared network adapter capability to client LPARs 114 within CEC 110. As provided herein, VIOS 112 supports Virtual real memory and Virtual shared storage functionality (with access to Distributed storage repository 150) as well as clustering functionality.

Within CEC 110A, VIOSes 112 and client LPARs 114 utilize an internal virtual network to communicate. This communication is implemented by API calls to the memory of the PHYP 225. The VIOS 112 then bridges the virtual network to the physical (I/O) adapter to allow the client LPARs 114 to communicate externally. The client LPARs 114 are thus able to be connected and inter-operate fully in a VLAN environment.

Those of ordinary skill in the art will appreciate that the hardware, firmware/software utility, and software components and basic configuration thereof depicted in FIGS. 1A, 1B and 2 may vary. The illustrative components of DPS 100 and specifically those within CEC 110A are not intended to be exhaustive, but rather are representative to highlight some of the components that are utilized to implement certain of the described embodiments. For example, different configurations of data processing systems/CECs devices may be provided, containing other devices/components, which may be used in addition to or in place of the hardware depicted, and may be differently configured. The depicted example is not meant to imply architectural or other limitations with respect to the presently described embodiments and/or the general invention. The CEC 110 depicted in the various figures may be, for example, an IBM eServer pSeries system, a product of International Business Machines Corporation in Armonk, N.Y., running the Advanced Interactive Executive (AIX) operating system or LINUX operating system.

B. Cluster-Aware VIOS

Certain of the features associated with the implementation of a cluster aware VIOS (e.g., VIOS 112 of FIGS. 1A, 1B and 2) are introduced above with reference to the description of the previous figures, and particularly FIG. 2. Descriptions of the specific functionality of the VIOS 112 will continue to be provided with reference to the illustrations of FIGS. 1A, 1B and 2. As presented by FIG. 2, each VIOS 112 is a virtual machine instance that emulates hardware in a virtualized environment. The VIOS 112 is tasked with emulating SCSI storage devices, and the VIOS 112 provides client LPARs 114 with access to distributed storage repository 150 in cooperation with the PHYP 225. Configuration of the VIOS 112 is performed through the hardware management tools of HMC 229. SCSI storage devices support a set of commands that allow SCSI initiators the ability to control access to storage (150). Database programs, for example, may manage access to distributed storage repository 150 through a set of SCSI commands commonly referred to as persistent reserve. Other types of reserves are also supported by VIOS 112, and the collective group of such commands is referred to herein as reserve commands.

As provided herein, each VIOS 112 allows sharing of physical I/O resources between client LPARs, including sharing of virtual Small Computer Systems Interface (SCSI) and virtual networking These I/O resources may be presented as internal or external SCSI or SCSI with RAID adapters or via Fibre-Channel adapters to distributed storage repository 150. The client LPAR 114, however, uses the virtual SCSI device drivers. In one embodiment, the VIOS 112 also provides disk virtualization for the client LPAR by creating a corresponding file on distributed storage repository 150 for each virtual disk. The VIOS 112 allows more efficient utilization of physical resources through sharing between client LPARs, and supports a single machine (e.g., CEC 110) to run multiple operating system (OS) images concurrently and isolated from each other.

In one or more embodiments, the VIOS operating system(s) is an enhanced OS that includes cluster-aware functionality and is thus referred to as a cluster aware OS (CA_OS). One embodiment, for example, utilizes cluster aware AIX (CAA) as the operating system. According to one embodiment, cluster-awareness enables multiple independent physical systems to be operated and managed as a single system. As provided within VIOS 112 of CEC 110A, VIOS 112 comprises cluster aware (CA) OS kernel 220 (or simply CA_OS 220), as well as LPAR function code 224 for performing OS kernel related functions for the VIOS LPARs 114. When executed within two or more nodes of DPS, CA_OS 220 enables various clustering functions, such as forming a cluster, adding members to a cluster, and removing members from a cluster, as described in greater detail below. CA_OS 220 manages the VIOS LPARs 112 and enables the VIOSes within a cluster to be cluster aware. CA_OS 220 comprises several functional modules. In the described embodiments, CA_OS 220 comprises cluster management (CM) utility 222 which supports the configuration of the VIOS to enable cluster-awareness and cluster-level functionality, such as redundant virtual I/O. Each of these additional software components of CA_OS 220 may be a functional module within CM utility, in one embodiment, and each module is thus described as such throughout the remainder of this specification. In one embodiment, CM utility 222 may be a separate utility that is locally installed or downloaded (from DB 140, for example) as an enhancement to an existing OS within a CEC 110 or VIOS 112, when initially configured for operation within the VIOS cluster. CM utility 222 is then executed when configuring the individual VIOS to create or join a cluster and/or become a cluster-aware node within the VIOS cluster. With this implementation structure, CM utility 222 enables the OS to support the various cluster-awareness and other cluster-level features and functionality. In an alternate embodiment, CA_OS 220 includes all the clustering features and functionality and established the various features when the CEC 110/VIOS 112 joins the cluster and/or during configuration of VIOS 112 to become cluster-aware.

In one implementation, functional components of CM utility 222 are encoded on local device storage of a corresponding VIOS 112, such that the VIOS 112 becomes automatically configured as a part of the VIOS cluster when the VIOS 112 is initially activated. On initial set up of the VIOS, VIOS API, kernel extensions and virtual adapters are configured within VIOS to enable communication with the other VIOSes, the VIOS DB 140, and with the distributed storage repository 150. During this initial setup of the VIOS 112, the VIOS executes a registration module of CM utility 222 to register VIOS 112 with the cluster. The registration module enables VIOS 112 to retrieve/download or have forwarded from DB 140 (on successful registration with the cluster) any additional CM software components and/or cluster-level information and/or data required to establish full cluster awareness when the VIOS has completed installation and is activated within the CEC 110. Thus, in one embodiment, in addition to the locally stored CA_OS components and software modules of CM utility 222, other functional components of CM utility 222 may be downloaded from DB 140 when CEC is powered on or when one or more VIOSes 112 are enabled on CEC 110. Once the VIOS 112 has completed its setup, one or more client LPARs 114 that are activated within CEC 110 may be assigned to VIOS 112, and VIOS 112 subsequently performs the various I/O operations initiated by the client 114 (as initiator) or directed to the client 114 (as target). Updates to the local VIOS data may periodically be made as changes are made within the VIOS cluster and/or as one or more new client LPARs 114 are added to the CEC 110 requiring VIOS support. In one embodiment, CM utility 222 may also enable retrieval and presentation of a comprehensive view of the resources of the entire cluster.

It is appreciated that while various functional aspects of the clustering operations are described as separate components, modules, and/or utility and associated data constructs, the entire grouping of different components/utility/data may be provided by a single executable utility/application, such as CA_OS 220 or CM utility 222. Thus, in one embodiment, CA_OS 220 executes within VIOS 112 and generates a plurality of functional components within VIOS 112 and within DB 140. Several of these functional components are introduced within FIG. 1B and FIG. 2 and others are described throughout the various embodiments provided herein. For simplicity in the descriptions which follow, references to CM utility 222 and CA_OS 220 will be assumed to be referring to the same general component (i.e., CM utility 222 being a subcomponent of CA_OS 220), and the terms may be utilized interchangeably throughout the specification.

As further presented by the illustrative embodiments (e.g., FIG. 2A), VIOS 112 includes one or more additional functional modules/components, such as VIO adapter(s) (interface) 226, and virtual I/O drivers/utility 228, which provides I/O functionality to VIOS 112 and enables VIOS 112 to route data traffic to and from data structures and storage within distributed storage repository 150 and/or DB 140. Virtual I/O adapter(s) 226 and CM utility 222 also enable the VIOS 112 to provide each client LPAR 114 with access to the full range of storage accessible within distributed storage repository 150 and other cluster-supported functionalities, as described herein.

In the illustrative embodiment, each client LPAR 114 communicates with VIOS 112 via PHYP 225. VIOS 112 and client LPAR 114A-114B are logically coupled to PHYP 225, which enables/supports communication between both virtualized structures. Each component forwards information to PHYP 225, and PHYP 225 then routes data between the different components in physical memory (233A-233M). In one embodiment, a virtualized interface of I/O adapters is also linked to PHYP 225, such that I/O operations can be communicated between the different logical partitions and one or more local and/or remote I/O devices. As with local I/O routing, data traffic coming in and/or out of I/O adapter interface or network interface from a remote I/O device is passed to the specific VIOS 112 via PHYP 225.

With the above introduced system configuration of FIGS. 1A, 1B and 2A, a first VIOS 112*a* (through a communication channel established via PHYP 225), grants access to another VIOS 112*b* through one or more virtual adapters. VIOS 112 includes the functionality to query PHYP 225 for the identity of the Client LPAR 114 on the CEC 110 where the VIOS 112 is currently running With the cluster aware VIOS infrastructure, different VIOSes 112 associated with different CECs 110 access the distributed storage repository 150 and cluster-level information is shared/communicated across the VIOS cluster (via VIOS DB 140) while each client I/O process is being performed. In this manner the VIOS associated with a first client on a first CEC is aware of which SAN disk resources are being accessed by a second client on a second CEC (or on the same CEC). With this awareness factored into the I/O exchange with the distributed storage repository 150, the VIOS associated with the first client can avoid accessing the same storage resource that is concurrently being utilized by the second client, thus preventing data integrity issues, which could potentially cause data corruption and client partition crashes.

Figure 3:
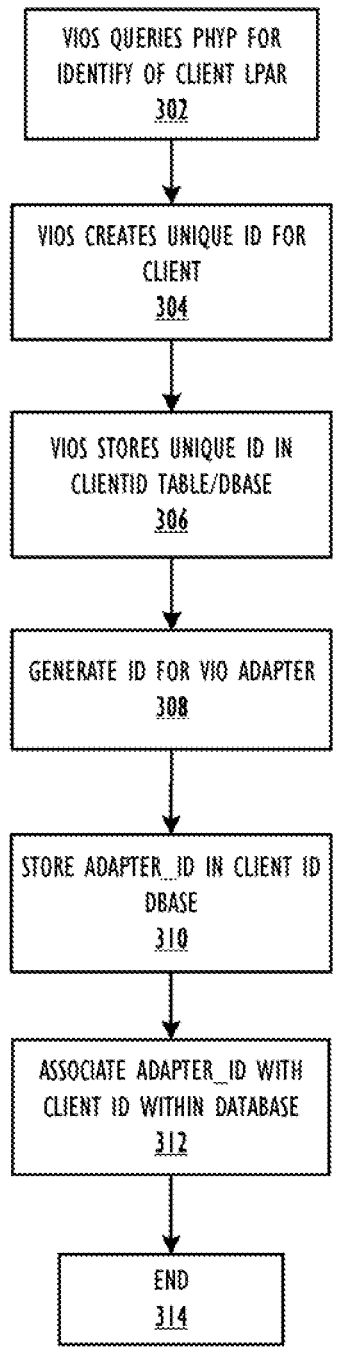
FIG. 3 is a flow chart of the method by which the process of client creation and registration is completed within a CA_DPS, according to one embodiment.

In one embodiment, VIOS functionality is enhanced to enable assigning of client identifiers (ID) and unique virtual I/O adapter IDs in a secure manner, while enabling storage pooling within virtual storage (within distributed storage repository 150). According to the described implementation, the different clientID-vioAdapterID pairings are unique throughout the cluster, so that no two clients throughout the entire cluster can share a same virtual adapter and no two vioAdapterIDs are the same within a single client. FIG. 3 is a flow chart illustrating the method by which a VIOS 112 on a CEC 110 with DPS 100 enables cluster level communication between a client LPAR 114 and distributed storage repository 150, according to one embodiment. The process begins at block 302 at which the VIOS 112 queries PHYP 225 for the identity of the client LPAR 114. At block 304, the VIOS 112 creates a unique identifier (ID) for the client (i.e., a ClientID). The VIOS 112 then stores the unique ClientID in ClientID data structure 159 (FIG. 1B) within DB 140 (block 306). The DB 140 and by extension the ClientID data structure 159 are accessible to each VIOS partition in the cooperating cluster (DPS 100). At block 308, the VIOS 112 also generates an identifier for each virtual IT nexus (virtual I/O AdapterID) that is utilized for each virtual adapter assigned to the client LPAR 114. In one embodiment, a client LPAR 114 can have multiple virtual adapters assigned thereto. These vio AdapterIDs are stored in the AdapaterID data structure 158 (block 310) and are associated with their corresponding clientIDs (block 312). The method illustrated by FIG. 3 ends at termination block 314, with each clientID having been associated with the corresponding one or more vio AdapterIDs with DB 140.

As described herein, a cluster is a set of one or more networked VIOS partitions, where each VIOS within the cluster has access to a common set of physical volumes. The physical volume resides within the VIOS cluster and is utilized to provide block storage. Implementation of the cluster awareness with the VIOSes of the cluster enables the VIOSes to provide cluster storage services to virtual clients (client LPARs 114). The VIOS software stack provides the following advanced capabilities, among others: Storage Aggregation and Provisioning; Thin Provisioning; Virtual Client Cloning; Virtual Client Snapshot; Virtual Client Migration; Distributed Storage Repository; Virtual Client Mirroring; and Server Management Infrastructure integration. More generally, the VIOS protocol allows distributed storage to be viewed as centralized structured storage with a namespace, location transparency, serialization, and fine grain security. The VIOS protocol provides storage pooling, distributed storage, and consistent storage virtualization interfaces and capabilities across heterogeneous SAN and network accessible storage (NAS). In order to provide block storage services utilizing the distributed repository, each VIOS configures virtual devices to be exported to virtual clients. Once each virtual device is successfully configured and mapped to a virtual host (VHOST) adapter, the clients may begin utilizing the devices as needed. In one embodiment, the virtualization is performed utilizing POWER™ virtual machine (VM) virtualization technology, which allows the device configuration process to occur seamlessly because the physical block storage is always accessible from the OS partition.

C. Autonomous Propagation of Virtual IO from First to Second VIOS Due to Fabric Loss According to one embodiment, to take advantage of the clustered VIOS configuration whereby multiple VIOSes have access (or can gain access) to a shared block storage (such as the distributed storage repository 150), virtual clients (client LPARs 114) are configured with redundant access to multiple VIOSes. With this ability to provide client LPARs 114 with redundant access to multiple VIOSes, the described embodiments further enable a reduction in I/O errors that would otherwise be caused by a loss of connectivity to the network fabric by any one VIOS supporting I/O operations of a client LPAR 114. Thus, as described in greater detail below, a first VIOS partition that is currently servicing I/O requests from an initiator (client LPAR 114) can propagate I/O resources to other VIOSes within the VIOS cluster, such that a second VIOS can service the I/O request, where backup I/O servicing is needed.

The below described embodiments are implemented within the various configurations of DPS 100 (FIGS. 1-2) having VIOSes 112 of one or more CECs 110 arranged in a VIOS cluster and supporting the I/O operations of the client LPARs located on the one or more CECs 110. As provided herein, the VIOSes are cluster aware and share cluster-level data via VIOS DB 140. Further, the VIOSes 112 provide the VIO operations that enable access to distributed storage repository (storage repository) 150. The various presented embodiments further provide application of management tool (180) functionality and descriptions of the messaging and communication protocols (of the clustered VIOSes 112) that collectively enable cluster-awareness and efficient I/O and storage virtualization and I/O and storage management within the DPS. As is described hereinafter, additional embodiments enable VIO operations to be autonomously propagated from a first VIOS to a second VIOS of the VIOS cluster following a fabric loss of the client-assigned (first) VIOS handling the VIO for the client LPAR. These embodiments are supported/provided by additional functionalities of (i.e., encoded within) the CA_OS 220 and/or specifically CM utility 222.

CM utility 222 is executed by virtual processing resources of VIOS 112 to provide a method for enabling the various I/O redundancy features and functionality described by the below presented embodiments. Among the method functions performed/provided by execution of the I/O redundancy module/code of the CM utility 222 are the following non-exclusive functions: (a) a first VIOS receiving an I/O request from the client LPAR; (b) detecting that a problem exists with a communication connection to the block storage; and (c) in response to detecting that the problem exists, autonomously propagating the I/O request to a second VIOS to which the first VIOS is connected within the VIOS cluster, wherein forwarding of the I/O request to the block storage is completed by the second VIOS.

Additional functions performed by the method include: receiving an I/O response from the second VIOS; identifying that the I/O response is associated with the I/O request that was propagated to the second VIOS; and in response to the I/O response being associated with the I/O request, forwarding the I/O response to the client LPAR. According to one embodiment, the propagating of the I/O request to the second VIOS further comprises: forwarding a first cluster-level request message to the second VIOS requesting the second VIOS take over handling of the I/O request; receiving a first cluster-level response message indicating that the second VIOS can handle the I/O request; and propagating the I/O request responsive to receiving the first cluster-level response message. Additionally, in a next embodiment, propagating of the I/O request to the second VIOS further comprises: receiving a second cluster-level response message indicating that the second VIOS cannot take over handling of the I/O request; and identifying a third VIOS within the VIOS cluster; forwarding a second cluster-level request message to the third VIOS; and autonomously propagating the I/O request to the third VIOS in response to receiving confirmation from the third VIOS that the third VIOS can handle the I/O request.

One embodiment provides a computer program product having a computer readable storage medium; and program code on the computer readable storage medium that when executed by a processor within a data processing system performs a series of functions including: creating within a virtualized environment, a first virtual input/output (I/O) server (VIOS) that handles I/O operations of a client logical partition (LPAR) generated within the virtualized environment of the data processing system; creating a VIOS cluster with the first VIOS and one or more second VIOSes located within the CEC, where each VIOS within the VIOS cluster are communicatively coupled to each other VIOS within the VIOS cluster; and enabling each VIOS within the VIOS cluster to provide virtual I/O (VIO) connectivity to a physical fabric connecting the VIOS to the block storage.

Figure 4:
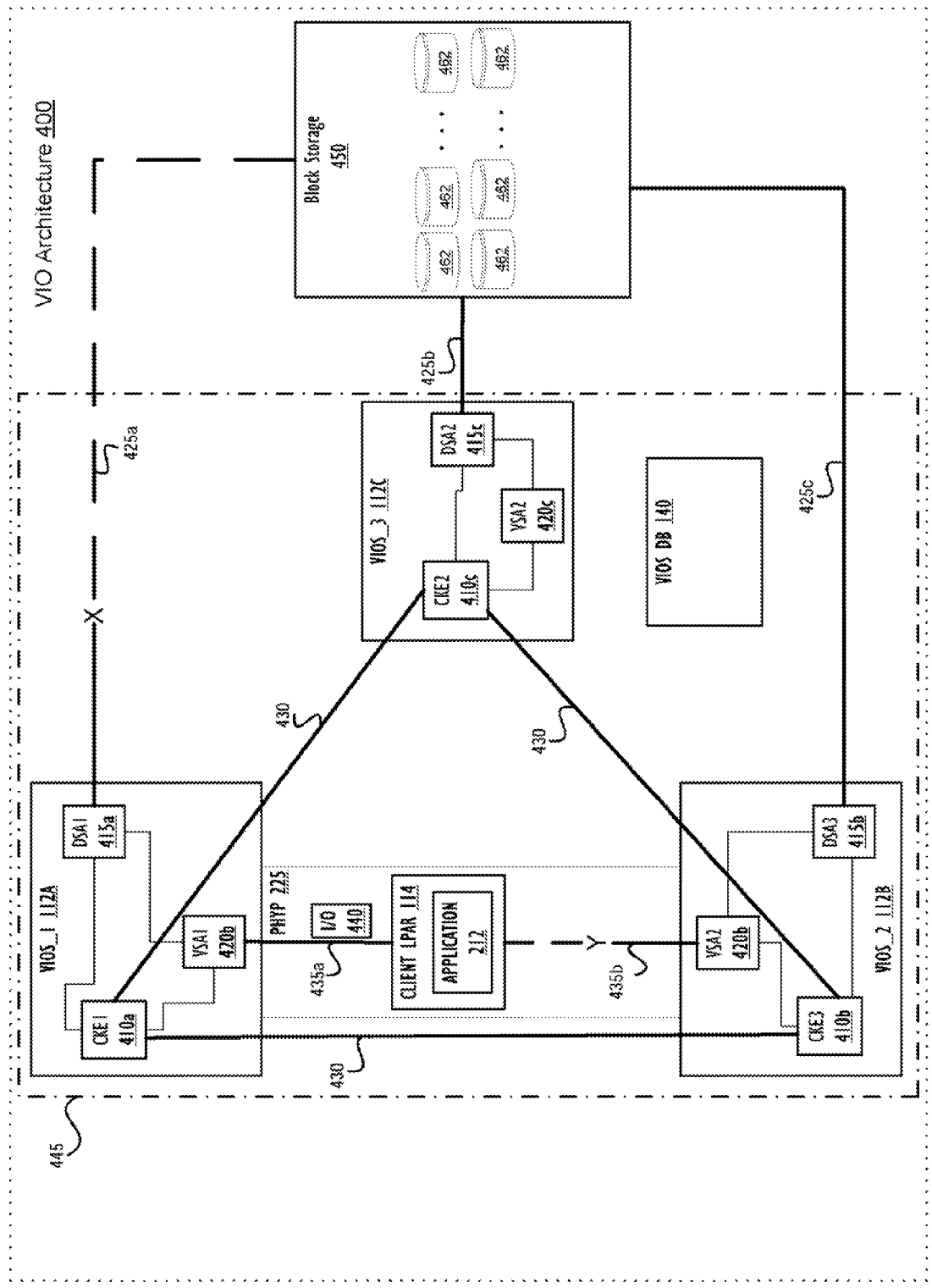
FIG. 4 is a block diagram representation of a cluster aware VIOS architecture that provides redundancy in VIO operations of a client logical partition (LPAR) due to a connectivity failure of a first VIOS assigned to the client LPAR, according to one embodiment.

Turning now to FIG. 4, there is illustrated a block diagram representation of the interconnectivity between VIOSes within an example VIOS cluster and between the VIOSes and shared block storage 450. Specifically, FIG. 6A provides a graphical representation of the method by which a first VIOS (112A) that is assigned to provide I/O operations for a client LPAR (114) responds to a loss of connectivity with the block storage facility 450, according to one embodiment. As utilized within the various embodiments, block storage 450 (or block storage facility) represents any type of storage that is generally accessible from any one of multiple VIOSes within a VIOS cluster. This, block storage 450 may be the distributed storage repository 150, other network accessible storage, or local storage (e.g., storage 234 of FIG. 2). When block storage 450 is distributed storage repository 150, block storage may be a SAN or NAS, in one embodiment.

As illustrated by FIG. 4, virtual I/O (VIO) architecture 400 comprises three interconnected VIOSes, VIOS1 112A, VIOS2 112B and VIOS3 112C. Each VIOS 112 connects to block storage 450 via respective system-level storage interconnect fabric 425a, 425b, and 425c. While illustrated as a single interconnect, the connection between the VIOSes and block storage 450 is generally referred to herein as a storage interconnect fabric 425 since the actual connection may be a complex switch or network of wires. It is further appreciated that one or more communication hops within storage interconnect fabric 425 can be a wireless connection. The term fabric loss thus refers to any type of degradation or stoppage in the ability of a VIOS 112 to transmit (or receive) data over any portion of storage interconnect fabric 425 to/from block storage 450. The actual type of fabric loss (at the storage level) does not directly affect the redundancy methodology being described herein.

Each of VIOS1 112A (first VIOS), VIOS2 112B (second VIOS) and VIOS3 112C (third VIOS) is interconnected via intra-cluster interconnect fabric 630, which connects each VIOS (e.g, VIOS_A 112A) with one or more other VIOSes (e.g., VIOS 112B and 112C) within to create the VIOS cluster 445. VIOS Cluster 445 also comprises VIOS DB 140 to which each VIOS 112 within the cluster is connected (via respective cluster-level interconnect fabric, which are not specifically shown). Notably, within the described embodiments, the second and/or third VIOSes (112b/112c) can exist on the same CEC or a different CEC within the cluster from the first VIOS 112a. To provide an illustration of the different treatment of VIOSes when on the same CEC or on a different CEC, VIOS2 112B is presented as on the same CEC, while VIOS2 112B is presented as existing on a different CEC, with the illustrations of FIG. 6B and 6C.

Each VIOS 112A, 112B, 112C includes internal software structures within respective software stacks by which the VIOSes 112A, 112B, 112C are able to communicate with each other as well as with VIOS DB 140 and distributed storage repository 150. For example, illustrated within first VIOS 112A are the following software structures, without limitation: (1) cluster kernel extension (CKE) 610a, which is a kernel extension that allows the each VIOS (e.g., first VIOS 112A) to communicate with other VIOS nodes (e.g., second VIOS 112B) within the VIOS cluster 445; (2) distributed storage access (DSA) 615a, which is also a virtual interface that monitors the connectivity of a storage fabric from the VIOS; and (3) virtual server adapter (VSA) 620a, which is the virtualized I/O adapter that the VIOS assigns to a specific client to communicate I/O requests between the client LPAR 114 and the assigned VIOS(es). During I/O redundancy operation, VSA 420 handles the communication of the I/O request from the client and the communication of I/O response to the client. DSA 415 checks the connection status of the storage interconnect 425 of the VIOS and signals CKE when a fabric loss condition is detected on the interconnect 425. CKE 410 handles the propagation of the I/O request to another VIOS when a fabric loss condition is detected by DSA and is communicated by DSA 415 to CKE 410. The additional functionality associated with and/or manner of usage of the above set of software structures are presented in detail below.

FIG. 4 also illustrates an example client LPAR 114 on which an application 212 executes to generate example I/O operations for completion within the distributed storage repository 150. Shown beneath client LPAR 114 is virtualization management component (represented as PHYP 225). As described above, communication between client LPAR 114 and VIOS 112a occurs via PHYP 225 operating as the emulation layer facilitation exchange between the two virtual partitions. Client LPAR 114 is illustrated with connectivity 435 (enabled via software) to first VIOS 112A and third VIOS 112C. In this context, first VIOS 112A is the primary VIOS assigned to client LPAR 114 and first VIOS 112A normally handles most I/O operations originating from or directed towards client LPAR 114. Thus, while first VIOS 112A is functional and communicatively connected to distributed storage repository 150, client LPAR 114 (operating as the initiator of an I/O operation) communicates desired I/O operations 440 to/through first VIOS 112A via virtualization management component (presented as PHYP 225, in the illustrative embodiments). First VIOS 112A then completes the I/O operations on behalf of client LPAR 114 by forwarding the I/O request to block storage 150 (the target of the I/O operation) if there is no storage fabric loss condition detected on storage interconnect fabric 425a. In this scenario, the I/O requests are forwarded over storage interconnect fabric 425a. Likewise, I/O response (data or instructions, etc.) returned from distributed storage repository 150 are routed via storage interconnect fabric 625a from block storage 450 to first VIOS 112A, and first VIOS 112A then routes the I/O information received to client LPAR 114 via pHYP 225.

As shown by FIG. 4, the communication path 435b between client LPAR 114 and second VIOS 112A has been degraded (perhaps due to internal software/hardware issues) and is currently unusable for the client's storage software stack. The path 435a through between client LPAR 114 and VSA1 420a (of VIOS1 112A) is available. However the physical connection (via storage interconnect 425a) to the block storage 450 has been degraded as VIOS1 112a is no longer connected to the block storage 450. With this scenario, in a non-clustered environment, the client LPAR 114 could potentially crash as all paths to the physical storage have been degraded. However, as provided within the clustered environment, with cluster-aware VIOSes, a new multi-path I/O (MPIO) solution is provided, and the I/O requests from client LPAR 114a is propagated to other VIOS nodes within the cluster for I/O processing. In the illustrative example, the I/O requests 440 sent from client LPAR 114 to VIOS1 112A is forwarded to CKE1 610a from VSA1 420a, and CKE1 610a forwards the I/O request 440 to CKE2 610b of the second VIOS 112B. CKE2 610b in turn sends the I/O request onward to the block storage 450. The described embodiments thus provide a cluster level of redundancy, which supports increased system availability and reliability within the clustered system when unforeseen hardware/software issues arise.

As further illustrated by FIG. 4, when a fabric loss condition occurs that results in a loss of communication between the first VIOS 112A that is assigned to provide I/O service to the client LPAR 114, the first VIOS 112A detects the loss of (or significant degradation in) connectivity at/on the storage interconnect fabric 635a between the first VIOS 112A and distributed storage repository 150. For illustrative purposes, a loss of VIOS connectivity (or access) to the distributed storage repository 150 is described as loss of physical connection (or connectivity) to the distributed storage repository 150, and is illustrated with an "X" marking a premature termination of the specific interconnect (625a). This fabric loss of connectivity is further illustrated and indicated by the presence of dashed lines. Thus, in contrast, the presence of solid connecting lines indicates the existence of a good connection between connected devices, as with second storage interconnect fabric 625b and third storage interconnect fabric 625c.

The presently described embodiments focus primarily on a communication loss that is a physical fabric loss (X). However, alternate embodiments contemplate situations in which the first VIOS 112A itself fails or has an internal error condition that prevents the first VIOS 112A from being able to provide/fulfill the I/O operations to/of the client LPAR 114. In this scenario, the loss may be software related, and one such loss is illustrated within FIG. 6 with a "Y" marking an in ability to communicate I/O operations from/to the client LPAR 114. In another embodiment, a third type of fabric loss, which is a loss of VIOS fabric connection to/with VIOS DB 140 may also be addressed by providing VIOS enabled backup redundancy.

Aspects of the various embodiments present autonomic responses to these different types of fabric connectivity losses and enable the I/O operations to proceed via redundant VIO connectivity within the VIOS cluster. Specifically, as described herein, the functionality associated with VIOS clustering (provided by CM utility 222) enables one or more of the interconnected VIOSes to respond to detection of such fabric loss conditions by transferring, forwarding or propagating one or more I/O requests/operations to a second (or third) VIOS within the VIOS cluster for processing. When the fabric loss condition is corrected, the first VIOS then resumes handling of the I/O operations of the specific client LPAR 114. In one alternate embodiment, the first VIOS 112A may notify the PHYP 225 to route additional I/O requests/operations intended for the first VIOS 112A through a different/second VIOS within the CEC until the first VIOS 112A detects recovery of the fabric connection with the block storage 450. The selection of the particular second VIOS may be based on selecting a "closest" VIOS as the second VIOS. In this implementation, the closest VIOS can be one or more of: a VIOS which takes a least amount of propagation time for transfer of the I/O request from the first VIOS; a VIOS which takes a least amount of propagation time for completing an I/O request at the distributed shared repository; and a VIOS among the VIOS cluster that is physically located on a same CEC as the first VIOS.

Figure 5:
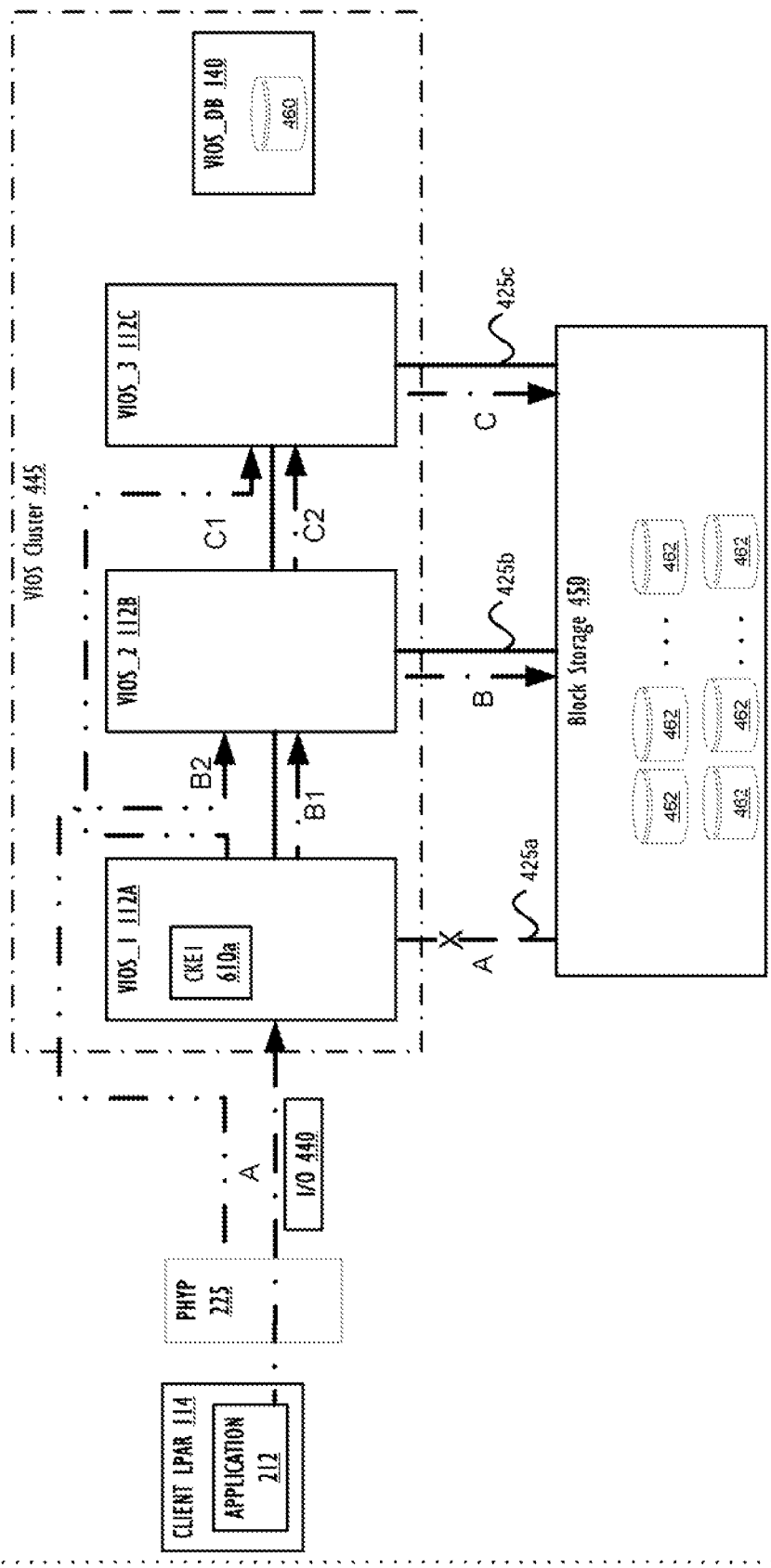
FIGS. 5 and 6 respectively illustrates the propagation of an I/O request and an I/O response through a VIOS cluster, where a first VIOS has a loss of connectivity to a shared block storage, in accordance with the described embodiments.
Figure 6:
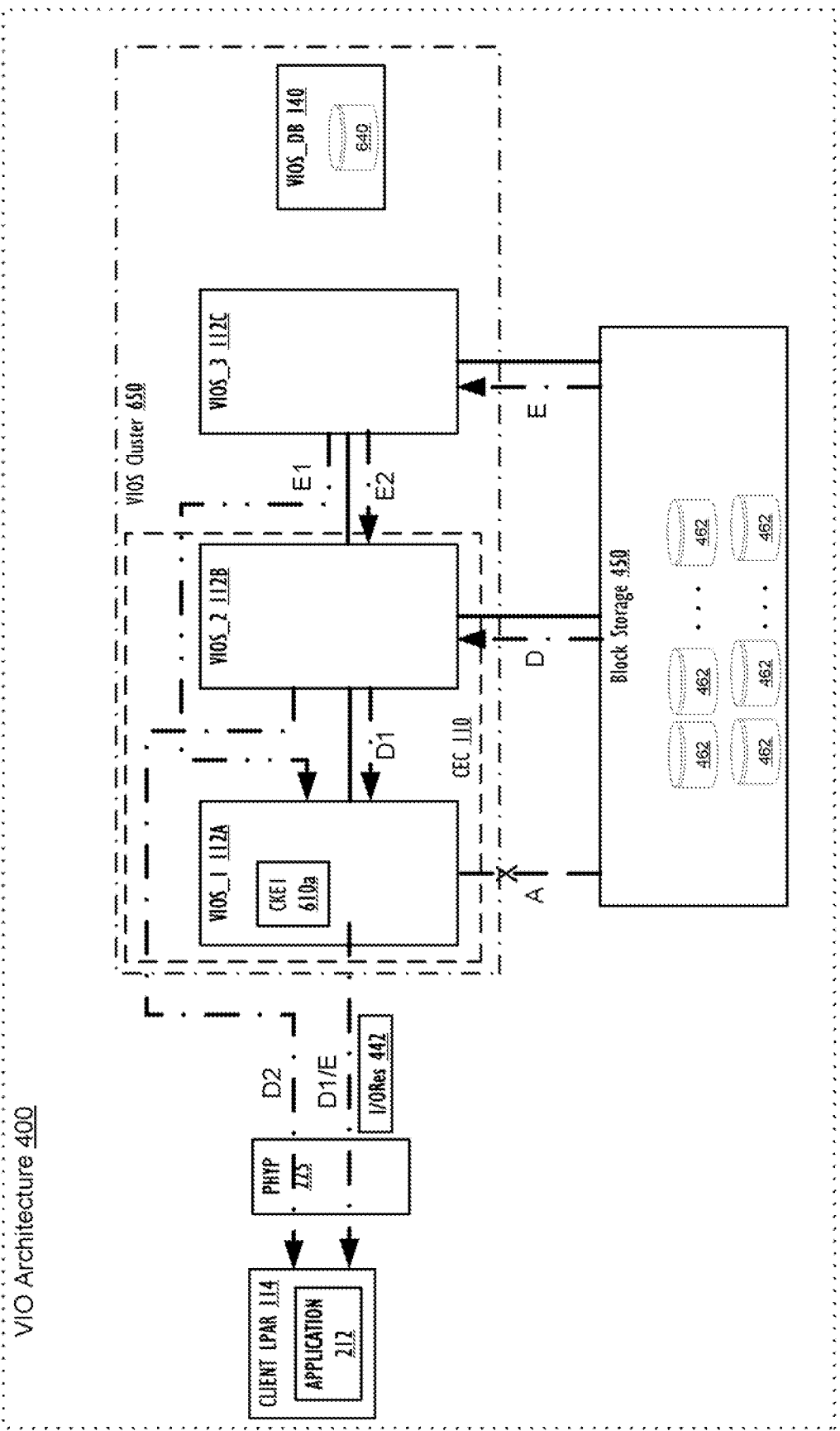

Turning now to FIGS. 5 and 6, which illustrate the communication paths for an I/O request and I/O response, in alternate embodiments. FIG. 5 illustrates the path progression of an I/O request from client LPAR 114 through a VIOS cluster 445 comprising three VIOSes, when backup/redundant I/O functionality is performed, according to one embodiment. Each VIOS 112A-112C is connected to block storage 450 by separate interconnects, and the storage interconnect fabric 425a of first VIOS 112A has a physical connection loss. FIG. 6 illustrates the path progression of an I/O response from block storage 450 through the VIOS cluster 445 when backup/redundant I/O functionality was initially invoked to complete the I/O request 440, according to one embodiment. Within the example virtualized I/O infrastructure 400 of FIGS. 4, 5, and 6, client LPAR 114 has multiple (direct or indirect) paths to the same target (block storage 450) through first VIOS 112A and second VIOS 112B and third VIO 112C, where required. In FIG. 5, when the second VIOS 112B is able to perform the I/O request 440, the I/O request 440 is transmitted along path B to second VIOS 112B, and second VIOS 112B transmits the I/O request 440 to block storage 450 via storage interconnect fabric 425b. When the second VIOS 112B is unable to perform the I/O request 440, the I/O request 440 is then propagated to the third VIOS 112C along one of paths C1 (indicating propagation from first VIOS 112A) or path C2 (indicating propagation from second VIOS 112B following an initial propagation of I/O request 440 from first VIOS 112A to second VIOS 112B). Third VIOS 112C then forwards the I/O request 440 via path C over the storage interconnect fabric 425c to distributed storage repository.

In FIG. 6, a set of alternate paths is provided for transmitting I/O responses from second VIOS 112B and/or third VIOS 112C, both depending on whether the I/O response is first transmitted to an intermediate VIOS before being sent to the client LAPR 114. Paths E1 and E2 respectively represent alternate paths for transmission of the I/O response 442 from third VIOS 112C depending on whether the corresponding I/O request 440 was initially received by third VIOS 112C from second VIOS 112B or first VIOS 112A. Paths D1 and D2 then respectively represent alternate paths for transmission of the I/O response 442 depending on whether the I/O redundancy functionality of the CM utility 222 allows VIOSes on the same CEC to automatically take over ongoing I/O operations of a client LPAR when another assigned VIOS registers a fabric loss condition. Assuming the CM utility 222 provides for a complete re-assignment of I/O operations to a next on-CEC VIOS, then path D2 represents the path taken by second VIOS 112 to complete notification of the I/O response 442 to client LPAR 114.

Figure 7A:
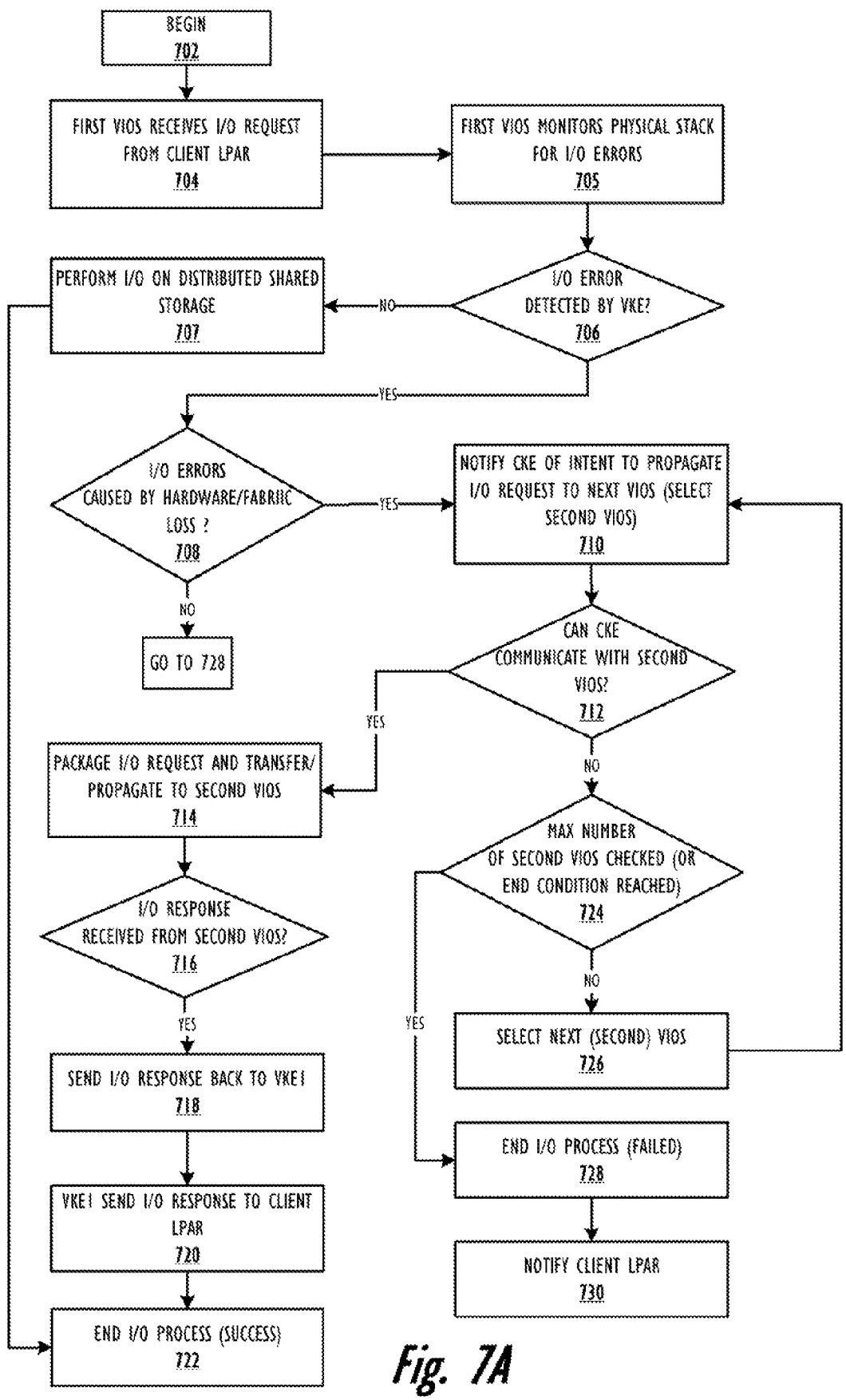
FIG. 7A is an example high-level logical flowchart illustrating the method of providing VIO redundancy within a VIOS cluster when a first VIOS looses connectivity to the shared block storage, according to one or more embodiments.
Figure 7B:
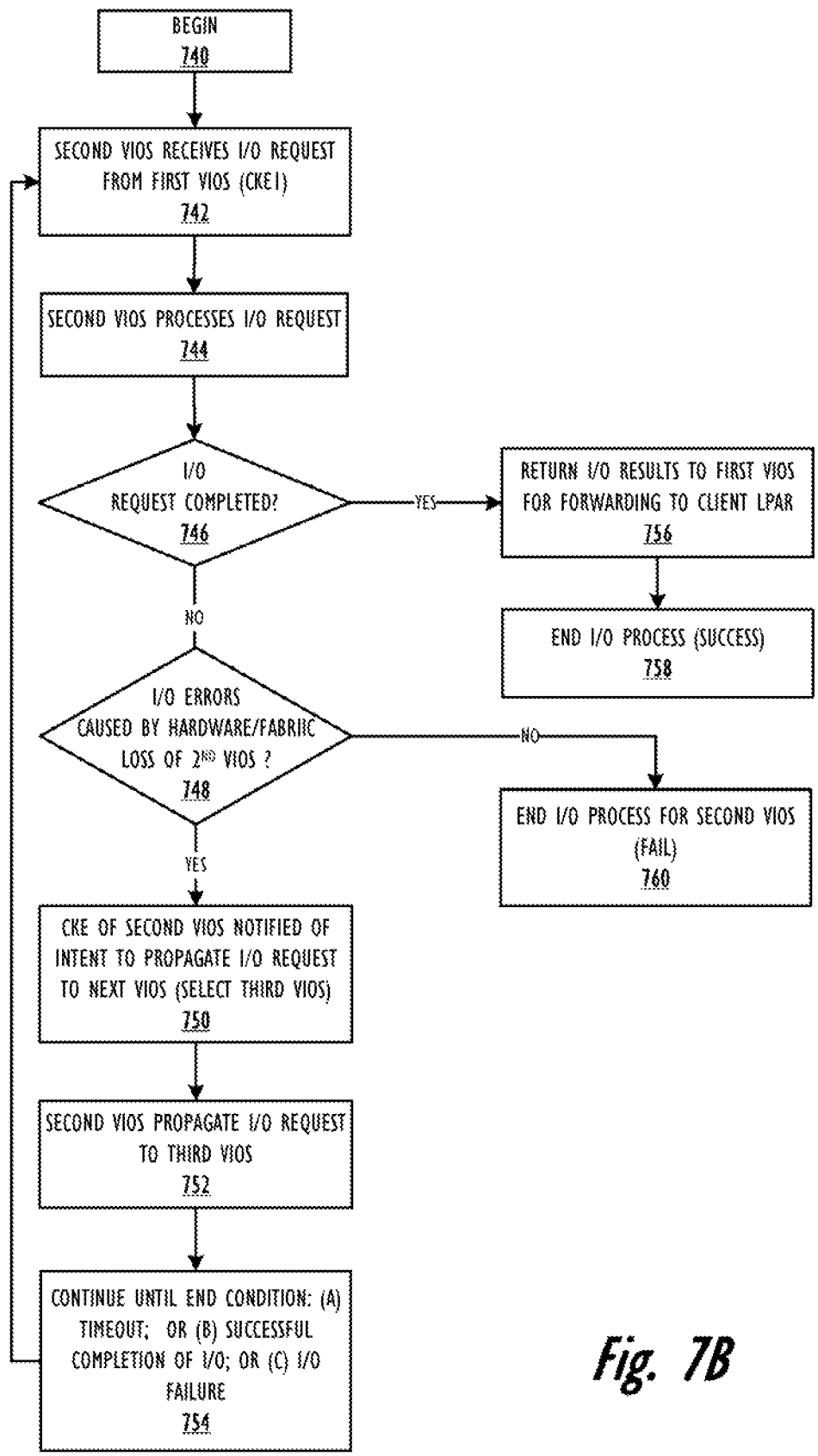
FIG. 7B is a high-level logical flowchart of an exemplary method by which a second VIOS provides the VIO redundancy for I/O operations that are unable to be completed by a first VIOS due to a software error or fabric loss, according to one or more embodiments.

FIGS. 7A and 7B are flow charts illustrating one or more methods by which the above introduced processes of the illustrative embodiments are completed. Although the methods illustrated by FIGS. 7A and 7B may be described with reference to components and functionality illustrated by and described in reference to FIGS. 1-6, it should be understood that this is merely for convenience and alternative components and/or configurations thereof can be employed when implementing the various methods. Certain portions of the methods may be completed by CM utility 222 executing on one or more (virtual) processors (CPU 206A) within VIOS 112 (FIG. 1 or 2) or on processing resources of management tool 180 (within management console 175). The executed processes then control specific operations of or on CECs 110, client LPARs 114, VIOSes 112, DB 140 and/or distributed storage repository 150. For simplicity in describing the methods, all method processes are described from the perspective of either/both CM utility 222 and VIOS/node 112. In describing the method of FIG. 7A, the directional flow of the I/O request and I/O response follows the arrows presented within FIGS. 5 and 6, and the description of FIGS. 7A and 7B should be read with reference to the I/O flow presented by FIGS. 5 and 6 and the general structure of FIG. 4.

Referring now to FIG. 7A, there is illustrated a high level logical flowchart of the method by which a fabric loss condition for a VIOS I/O operation is handled within the cluster-aware VIOS infrastructure. The method begins at block 702 and proceeds to block 704 at which first VIOS 112A receives an I/O request 445 from client LPAR 114 (along communication path A, FIG. 5). The first VIOS 112A continually monitors the physical stack for I/O errors (block 705). Specifically, DSA1 415a of the first VIOS 112A includes configuration information to enable the DSA1 415a to identify if the physical stack is returning I/O errors due to hardware issues or loss of connectivity to the block storage 450. The first VIOS 112A, through DSA1 415a, thus determines at block 706 whether the VIOS has received notification that the physical stack is returning I/O errors. When no fabric loss is detected by first VIOS 112A, first VIOS forwards the I/O operation 640 to the distributed storage repository 150 (block 707) for completion of the I/O request. The process of transmitting the I/O request 640 ends with a successful transmission of the I/O request to the block storage 150 (block 722).

Following detection of an I/O error at decision block 706, when, as determined at decision block 708, the detected I/O errors are not due to hardware issues or loss of connectivity to the distributed repository, the process ends at block 728, with a failed I/O operation. However, when the detected I/O errors are due to hardware issues or loss of connectivity to the distributed repository, the first VIOS 112A notifies CKE1 610a that the first VIOS 112A intends to propagate the current I/O requests 640 to a partner node, selected as second VIOS 112B (block 710).

The selection of a second VIOS may be based on a pre-established order of selection, such that first VIOS 112A always selects second VIOS 112B as the backup, redundant VIOS for handling VIO operation of client LPARs when the first VIOS 112A encounters or is experiencing a fabric loss. In an alternate embodiment, the selection of the second VIOS from among all available VIOSes within the cluster based on one or more determinable factors. Possible factors relied upon for making this consideration include, but are not limited to: (a) the relative location of the second VIOS, where a VIOS located on the same CEC is given higher priority for allocation as a redundant/backup VIOS for all I/O operations originating at that CEC, (b) client-based VIOS allocation, where a second VIOS that is supporting clients that are commonly owned (e.g., two clients of a single company having two different VIOSes handling I/O operations would then have their assigned VIOSes operate as a backup VIOS for I/O redundancy); and (c) a security level of the first VIOS, where each VIOS may have different security levels, and a redundant/backup second VIOS would be selected that provides the same level of security.

From block 710, the method proceeds to decision block 712 at which the first VIOS 112A determines whether CKE1 610a can successfully communicate with a selected second VIOS 112B. When the CKE1 610a is unable to communicate with the second VIOS 112B, CM utility 222 determines at block 724 if a maximum number of second VIOSes have been contacted to host the I/O request with no second VIOS accepting to host the I/O request. That is the CKE1 610a may check multiple different VIOSes within the cluster until the CKE1 610a finds a VIOS that is capable of hosting the I/O operation. The maximum number of second VIOS ranges from one (1) to a total number of VIOSes within the cluster to which the first VIOS 112A can propagate the I/O request. In one embodiment, the maximum number is also restricted by a pre-established maximum timeframe for completing the I/O request before the request is timed out and reported as a failed request to the client LAPR 114. When the maximum number of second VIOSes has not yet been checked, the CKE1 610a identifies and selects a next second VIOS (block 726). The CKE1 610a obtains the identity (ID) of the next VIOS and attempts to transfer the I/O request to that next VIOS (block 710). According to the illustrated embodiment, following a failure to propagate the I/O request to a second VIOS, the selection process can be repeated up to a maximum number of iterations, ranging from 0 through N-2, where N is the total number of VIOSes in the cluster with which the first VIOS is interconnected. In one embodiment, the checking of interconnected VIOSes continues until an end condition is encountered (block 718) or the I/O request has been processed. If the maximum number of second VIOSes has been checked, the I/O process terminates as failed (block 728), and the failure is communicated to the client LPAR 114 (block 730).

In one embodiment, a time out period is established by the first VIOS 112A for completion of the I/O request, whether by the first VIOS 112A or by a subsequently assigned second VIOS (e.g., due to first VIOS 112A being unable to perform the I/O request because of a fabric loss with the block storage 150). With this embodiment, an internal timer is activated by the VIOS on receipt of the I/O request (and each I/O request may be assigned a separate timer). When the I/O request is not completed within the pre-established time out period (i.e., the timeout period expires before the I/O request completes, the first VIOS 112A signals the client LPAR 114 of the failure of the I/O request. However, the timeout period is initiated to a value that enables multiple different hops of the I/O request across several different VIOSes that are directly connected to the first VIOS 112a or connected to the first VIOS via one or more intermediate VIOSes within the cluster. The clustered VIOSes are thus able to methodically propagate I/O requests to other VIOSes when specific conditions are encountered within an I/O path due to event notifications received from the physical stack when the VIOS attempts to access the block storage 450.

Returning to block 712, in response to the CKE1 610a being able to communicate with second VIOS 112B, first VIOS 112A packages the I/O request and propagates the I/O request over the intra-cluster interconnect 430 (block 714). As shown in FIG. 5, the I/O request is transmitted via path B to second VIOS. FIG. 7B, described below, illustrates the method by which the second VIOS 112B processes the receipt of the I/O request from the first VIOS 112A. First VIOS 112A then monitors for receipt of an I/O response and checks at block 716 whether an I/O response (to the propagated I/O request) is received from the second VIOS. It is appreciated that not all I/O requests will generate an I/O response, and thus this sequence occurs only with those I/O requests that do trigger receipt of an associated I/O response. When the first VIOS 112A receives the I/O response 442, the first VIOS transmits the I/O response to VSA1 620a (block 718), and VSA1 620a forwards the I/O response 442 to the client LPAR 114 (block 720) (via path D1 of FIG. 6C). The first VIOS 112A then signals the I/O process as successfully completed (block 722).

Turning now to FIG. 7B, there is illustrated the method by which the second VIOS 112B processes the received I/O request 440 from a first VIOS 112A. The method begins at block 740 and proceeds to block 742 at which second VIOS 112B receives the I/O request 440 from first VIOS 112A. Once received at the second VIOS 112B, the second VIOS 112B processes the I/O request (block 744). A determination is made at block 746 whether the I/O request has been completed. As provided by FIG. 5, second VIOS 112B completes processing of the I/O request 440 by forwarding the I/O request 440 via path B to distributed storage repository 150. In response to the I/O request 440 (or processing of the I/O request) completing, the second VIOS 112B issues/returns the I/O results/response (if any) to the first VIOS 112A for forwarding to the client LPAR 114 (block 756). Specifically, the CKE2 410b of the second VIOS 112B sends the response back to CKE1 410a of the first VIOS 112b. At first VIOS 112A, CKE1 610a forwards the I/O response/result to VSA1 620a, and VSA1 620a forwards the response back to client LPAR 114. The backup/redundant I/O process then ends at the second VIOS 112B and at the first VIOS 112A (block 758).

As described above, FIG. 6 illustrates alternate methods of providing I/O results/response 442 to client LPAR 114. In a first embodiment, the I/O response 442 is transmitted via path D1 via first VIOS 112A. In a second alternate embodiment, when both first VIOS 112A and second VIOS 112B exists on the same CEC 110, the I/O response 442 is provided directly from second VIOS 112B to client LPAR 114 along path D2.

Returning to decision block 746 of FIG. 7, in response the I/O request not completing at the second VIOS 112B, a determination is made at clock 748 whether the I/O errors detected are being caused by a hardware/fabric loss condition affecting the second VIOS 112B. When the I/O errors are not caused by a fabric loss, the processing of the I/O request ends at the second VIOS 112B (block 760). However, when the I/O errors are caused by a fabric loss at the second VIOS 112B (after the propagation of the I/O request 440 to the second VIOS 112B has occurred), CKE2 610b of the second VIOS 112B receives a notification from DSA2 415b of the fabric loss condition and CKE2 610b prepares to further propagate the I/O request 440 to a next VIOS (e.g., third VIOS 112C) (block 750). Second VIOS 112B then propagates the I/O request 440 to the third VIOS 112C (block 752). The process of forwarding the I/O request to a next VIOS within the cluster due to fabric loss conditions at the current VIOS continues until (a) a VIOS that receives the I/O request is able to complete processing of the I/O request 640 (block 754) or (b) an end condition is reached.

The various embodiments provide implementation of VIO redundancy to support autonomous propagation of I/O operations to other VIOSes within a VIOS cluster in order to substantially reduce the occurrence of I/O errors due to fabric loss. According to the various embodiments, at least one physical communication interconnect is present between each member within the cluster. In some embodiments, I/O redundancy is further provided by implementing multiple communication interconnects between components such that the delivery of VIOS communication between two CKEs (e.g., CKE1 610a and CKE2 610b) increases the likelihood of cluster communication when one communication path may be down, degraded, or unusable.

The flowcharts and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. In a data processing system having (a) a client logical partition (LPAR) that generates and consumes input/output (I/O) requests, (b) a plurality of virtual input/output servers (VIOS) that are communicatively inter-connected with each other to form a VIOS cluster and which include virtual I/O adapters for connecting to a fabric that provides access to a block storage, a method comprising:
    a first VIOS receiving an I/O request from the client LPAR;
    detecting that a problem exists with a communication connection of the first VIOS to the block storage; and in response to detecting that the problem exists with the communication connection of the first VIOS to the block storage, the first VIOS:
  selecting a second VIOS, to which the first VIOS is connected from the plurality of VIOSes within the VIOS cluster, to propagate the I/O request thereto, wherein said selecting further includes selecting a closest path VIOS as the second VIOS, wherein the closest path VIOS is one or more of: a VIOS which takes a least amount of propagation time for transfer of the I/O request from the first VIOS; a VIOS which takes a least amount of propagation time for completing an I/O request at the distributed shared repository; and a VIOS among the VIOS cluster that is physically located on a same computing electronic complex (CEC) as the first VIOS; and
  autonomously propagating the I/O request to the second VIOS, wherein forwarding of the I/O request to the block storage is completed by the second VIOS.

2. The method of claim 1, further comprising:
  receiving an I/O response from the second VIOS;
  identifying that the I/O response is associated with the I/O request that was propagated to the second VIOS; and
  in response to the I/O response being associated with the I/O request, forwarding the I/O response to the client LPAR.

3. The method of claim 1, wherein propagating of the I/O request to the second VIOS further comprises:
  forwarding a first cluster-level request message to the second VIOS requesting the second VIOS take over handling of the I/O request;
  receiving a first cluster-level response message indicating that the second VIOS can handle the I/O request; and
  propagating the I/O request responsive to receiving the first cluster-level response message.

4. The method of claim 3, further comprising:
  receiving a second cluster-level response message indicating that the second VIOS cannot take over handling of the I/O request;
  identifying a third VIOS within the VIOS cluster;
  forwarding a second cluster-level request message to the third VIOS; and
  autonomously propagating the I/O request to the third VIOS in response to receiving confirmation from the third VIOS that the third VIOS can handle the I/O request.

5. The method of claim 1, wherein the second VIOS is selected from one or more VIOSes within the plurality of VIOSes of the VIOS cluster that are pre-assigned as a backup VIOS for redundant I/O processing of I/O requests of the first VIOS.

6. The method of claim 1, wherein the data processing system comprises a first computing electronic complex (CEC) and the first VIOS and second VIOS are physically located on the CEC.

7. The method of claim 1, wherein:
  the data processing system comprises a plurality of computing electronic complexes (CECs);
  the first VIOS is physically located on a first CEC while the second VIOS is physically located on a second CEC; and
  the first VIOS and the second VIOS each comprise a virtual processor executing a cluster-aware operating system (OS) and a cluster management utility, and are both cluster-aware.

8. A computing electronic complex (CEC) comprising:
  a processor;
  one or more physical input/output (I/O) adapters that support I/O communication with a block storage; and
  a memory coupled to said processor, wherein said memory includes:
    a virtualization management component that supports creation of and communication between one or more virtualized operating system (OS) partitions;
    a plurality of operating system (OS) partitions, including a first virtual input/output (I/O) server (VIOS) and a client logical partition (LPAR), wherein the first VIOS handles all I/O operations of the client LPAR;
    a cluster management utility executing within the first VIOS and which enables the first VIOS to:
      create a VIOS cluster with the first VIOS and one or more second VIOSes located within the CEC, where each VIOS within the VIOS cluster are communicatively coupled to each other VIOS within the VIOS cluster;
      enable each VIOS within the VIOS cluster to provide virtual I/O (VIO) connectivity to a physical fabric connecting the VIOS to the block storage;
      provide I/O redundancy within the VIOS cluster by enabling the first VIOS to perform the functions of:
        receive an I/O request from the client LPAR;
        detect that a problem exists with a communication connection of the first VIOS to the block storage; and
        in response to detecting that the problem exists with the communication connection of the first VIOS to the block storage, the first VIOS:
          select a second VIOS, to which the first VIOS is connected from the plurality of VIOSes within the VIOS cluster, to propagate the I/O request thereto, wherein said first VIOS selects the second VIO by selecting a closest path VIOS as the second VIOS, wherein the closest path VIOS is one or more of: a VIOS which takes a least amount of propagation time for transfer of the I/O request from the first VIOS; a VIOS which takes a least amount of propagation time for completing an I/O request at the distributed shared repository; and a VIOS among the VIOS cluster that is physically located on a same computing electronic complex (CEC) as the first VIOS; and
          autonomously propagate the I/O request to the second VIOS, wherein forwarding of the I/O request to the block storage is completed by the second VIOS.

9. The computing electronic complex of claim 8, wherein the first VIOS is further enabled to:
  receive an I/O response from the second VIOS;
  identify that the I/O response is associated with the I/O request that was propagated to the second VIOS; and
  in response to the I/O response being associated with the I/O request, forward the I/O response to the client LPAR.

10. The computing electronic complex of claim 1, wherein propagating of the I/O request to the second VIOS further comprises the first VIOS:
  forwarding a first cluster-level request message to the second VIOS requesting the second VIOS take over handling of the I/O request;
  receiving a first cluster-level response message indicating that the second VIOS can handle the I/O request; and propagating the I/O request responsive to receiving the first cluster-level response message.

11. The computing electronic complex of claim 10, wherein the first VIOS is further enabled to:
receive a second cluster-level response message indicating that the second VIOS cannot take over handling of the I/O request;
identify a third VIOS within the VIOS cluster;
forward a second cluster-level request message to the third VIOS; and
autonomously propagate the I/O request to the third VIOS in response to receiving confirmation from the third VIOS that the third VIOS can handle the I/O request.

12. The computing electronic complex of claim 8, wherein the second VIOS is selected from one or more VIOSes within the plurality of VIOSes of the VIOS VIOS cluster that are pre-assigned as a backup VIOS for redundant I/O processing of I/O requests of the first VIOS.

13. The computing electronic complex of claim 8, wherein the first VIOS and second VIOS are physically located on the CEC.

14. A data processing system (DPS) comprising:
a plurality of computing electronic complexes (CECs) including the CEC of claim 6;
wherein the first VIOS is physically located on the CEC while the second VIOS is physically located on a second CEC of the DPS; and
the first VIOS and the second VIOS each comprise a virtual processor executing a cluster-aware operating system (OS) and a cluster management utility, and are both cluster-aware.

15. A computer program product comprising:
a non-transitory computer readable storage device; and
program code on said non-transitory computer readable storage device that when executed by a processor within a data processing system performs the functions of:
creating within a virtualized environment, a first virtual input/output (I/O) server (VIOS) that handles I/O operations of a client logical partition (LPAR) generated within the virtualized environment of the data processing system;
creating a VIOS cluster with the first VIOS and one or more second VIOSes located within the CEC, where each VIOS within the VIOS cluster are communicatively coupled to each other VIOS within the VIOS cluster;
enabling each VIOS within the VIOS cluster to provide virtual I/O (VIO) connectivity to a physical fabric connecting the VIOS to the block storage;
providing I/O redundancy within the VIOS cluster by enabling the first VIOS to perform the functions of:
receiving an I/O request from the client LPAR;
detecting that a problem exists with a communication connection of the first VIOS to the block storage; and
in response to detecting that the problem exists with the communication connection of the first VIOS to the block storage, the first VIOS:
selecting a second VIOS, to which the first VIOS is connected from the plurality of VIOSes within the VIOS cluster, to propagate the I/O request thereto, wherein said program code selecting the second VIOS comprises code that executes to select a closest path VIOS as the second VIOS, wherein the closest path VIOS is one or more of: a VIOS which takes a least amount of propagation time for transfer of the I/O request from the first VIOS; a VIOS which takes a least amount of propagation time for completing an I/O request at the distributed shared repository; and a VIOS among the VIOS cluster that is physically located on a same computing electronic complex (CEC) as the first VIOS; and
autonomously propagating the I/O request to the second VIOS, wherein forwarding of the I/O request to the block storage is completed by the second VIOS.

16. The computer program product of claim 15, said program code further comprising code that executes to perform the following function:
receiving an I/O response from the second VIOS;
identifying that the I/O response is associated with the I/O request that was propagated to the second VIOS; and
in response to the I/O response being associated with the I/O request, forwarding the I/O response to the client LPAR.

17. The computer program product of claim 15, wherein the program code that performs the propagating of the I/O request to the second VIOS further comprises code for:
forwarding a first cluster-level request message to the second VIOS requesting the second VIOS take over handling of the I/O request;
receiving a first cluster-level response message indicating that the second VIOS can handle the I/O request; and
propagating the I/O request responsive to receiving the first cluster-level response message.

18. The computer program product of claim 17, wherein said program code further comprises code for:
receiving a second cluster-level response message indicating that the second VIOS cannot take over handling of the I/O request;
identifying a third VIOS within the VIOS cluster;
forwarding a second cluster-level request message to the third VIOS; and
autonomously propagating the I/O request to the third VIOS in response to receiving confirmation from the third VIOS that the third VIOS can handle the I/O request.

19. The computer program product of claim 15, wherein the second VIOS is selected from one or more VIOSes within the plurality of VIOSes of the VIOS cluster that are pre-assigned as a backup VIOS for redundant I/O processing of I/O requests of the first VIOS.

20. The computer program product of claim 15, wherein the data processing system comprises a first computing electronic complex (CEC) and the first VIOS and second VIOS are physically located on the CEC.

21. The computer program product of claim 15, wherein:
the data processing system comprises a plurality of computing electronic complexes (CECs);
the first VIOS is physically located on a first CEC while the second VIOS is physically located on a second CEC; and
the first VIOS and the second VIOS each comprise a virtual processor executing a cluster-aware operating system (OS) and a cluster management utility, and are both cluster-aware.

\* \* \* \* \*